United States Patent [19]

Kendall, Jr. et al.

[11] Patent Number: 4,611,656
[45] Date of Patent: Sep. 16, 1986

[54] PROTECTIVE JACKET ASSEMBLY

[76] Inventors: Clarence E. Kendall, Jr., 3827 Wickersham, Houston, Tex. 77027; Boyd B. Moore, 427 Mignon, Houston, Tex. 77024

[21] Appl. No.: 774,985

[22] Filed: Sep. 11, 1985

Related U.S. Application Data

[60] Continuation-in-part of Ser. No. 691,483, Jan. 14, 1985, abandoned, which is a continuation of Ser. No. 575,218, Jan. 30, 1984, abandoned, which is a continuation of Ser. No. 453,360, Dec. 27, 1982, abandoned, which is a division of Ser. No. 247,526, Mar. 25, 1981, abandoned, which is a continuation-in-part of Ser. No. 000,017, Dec. 29, 1979, abandoned.

[51] Int. Cl.$^4$ .............. E21B 17/10; F16L 11/12; B21D 39/03; H01B 7/24
[52] U.S. Cl. .................. 166/65.1; 29/429; 29/463; 138/107; 138/112; 166/72; 166/77; 166/242; 174/27; 174/47; 174/102 SP; 174/136
[58] Field of Search .......... 166/65.1, 72, 77, 242, 166/367, 379, 380; 174/24, 27, 47, 95–97, 102 SP, 103, 117 R, 117 F, 127, 136; 138/107, 110–112, 115, 117, 128; 29/429, 463, 825; 156/51, 52, 55

[56] References Cited

U.S. PATENT DOCUMENTS

| 246,407 | 8/1881 | McTighe | 156/52 X |
|---|---|---|---|
| 355,867 | 1/1887 | Denison | 174/96 X |
| 366,195 | 7/1887 | Arnold et al. | 138/117 |
| 1,914,830 | 6/1933 | Kostohris | 104/275 |
| 2,166,031 | 7/1939 | Wendell | 104/275 |
| 2,829,190 | 4/1958 | Comlossy, Jr. | 174/47 |
| 3,108,639 | 10/1963 | Brooks | 166/241 |
| 3,430,337 | 3/1969 | Kelly | 29/828 |
| 3,459,875 | 8/1969 | Fork | 138/115 X |
| 3,775,552 | 11/1973 | Schumacher | 174/117 F X |
| 3,844,345 | 10/1974 | Evans et al. | 138/111 X |
| 3,887,265 | 6/1975 | Margolis et al. | 350/96.23 |
| 3,933,203 | 1/1976 | Evans | 166/241 |
| 4,004,326 | 1/1977 | Beavers | 166/241 X |
| 4,042,023 | 8/1977 | Fox | 166/241 |
| 4,089,585 | 5/1978 | Slaughter | 350/96.23 |
| 4,155,530 | 5/1979 | Oguni et al. | 138/110 X |
| 4,202,087 | 5/1980 | Wilderman | 166/242 X |

FOREIGN PATENT DOCUMENTS

| 14880 | 3/1903 | Austria | 138/117 |
|---|---|---|---|
| 195694 | 2/1958 | Austria | |
| 2330673 | 12/1974 | Fed. Rep. of Germany | 174/117 F |
| 2518726 | 11/1975 | Fed. Rep. of Germany | 174/47 |
| 2036798 | 12/1970 | France | |
| 2359527 | 2/1978 | France | 174/117 F |
| 1250823 | 10/1971 | United Kingdom | 174/136 |
| 1422147 | 1/1976 | United Kingdom | 350/96 B |

Primary Examiner—Stephen J. Novosad
Attorney, Agent, or Firm—Guy E. Matthews

[57] ABSTRACT

A crush and abrasion resistant, sealed, impervious, flexible protective jacket assembly for oil and gas wells containing a plurality of electrical and/or fluid conductors that are oriented in linear, spaced, parallel relation. A pair of elongated protective metal sheets define elongated conductor grooves. The metal sheets are joined by welding to define a plurality of elongated chambers containing one or more of the conductors. The chambers are sealed from the atmosphere and may be filled with a non-gaseous dielectric material to prevent the development of corona discharge that might cause deterioration of the protective jacket assembly. The configuration of the sheets of protective material is such that the development of corona discharge is resisted. A pair of metal longitudinal structural elements are attached at opposed sides of the protective jacket assembly and prevent damage thereto by abrasion, crushing, bending, etc., and provide sufficient tensile strength so that the protective jacket assembly will support its entire length.

62 Claims, 12 Drawing Figures

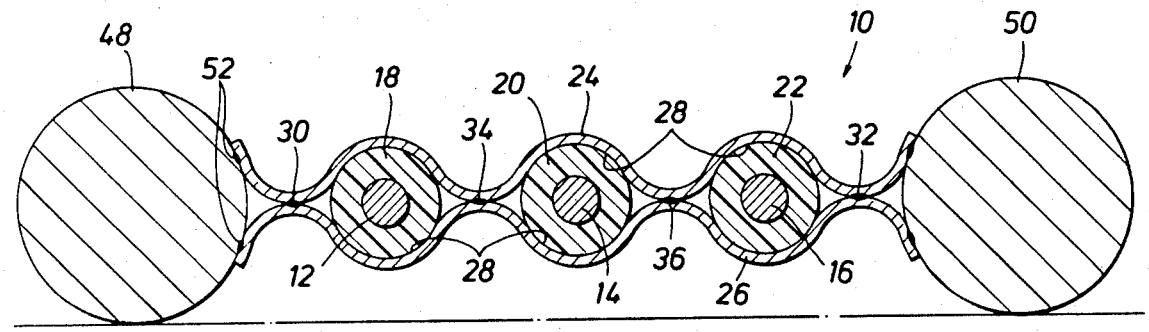
FIG. 1
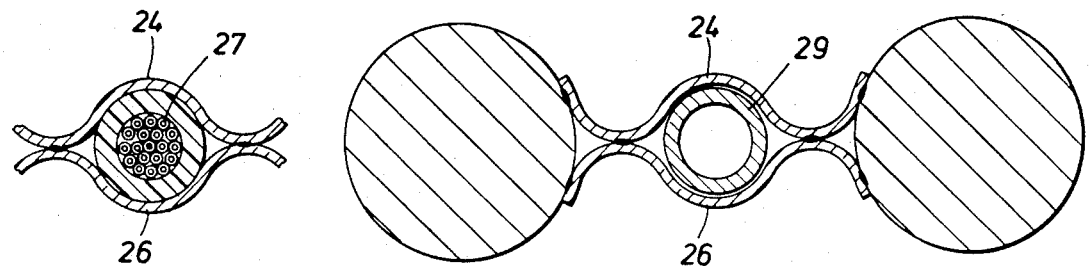
FIG. 3
FIG. 2
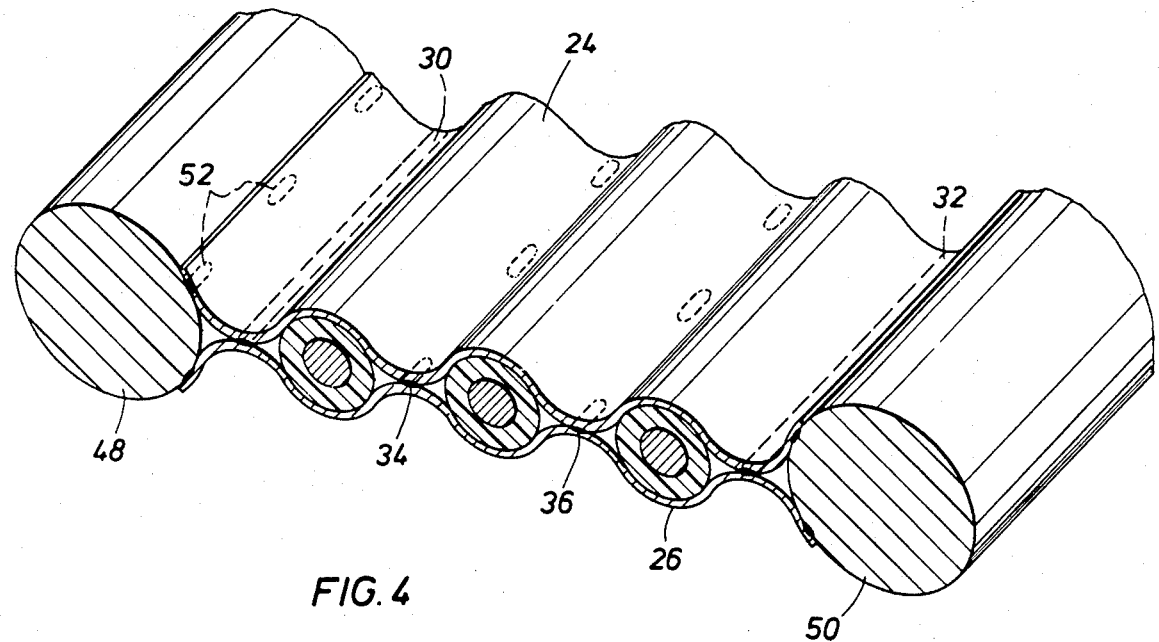
FIG. 4

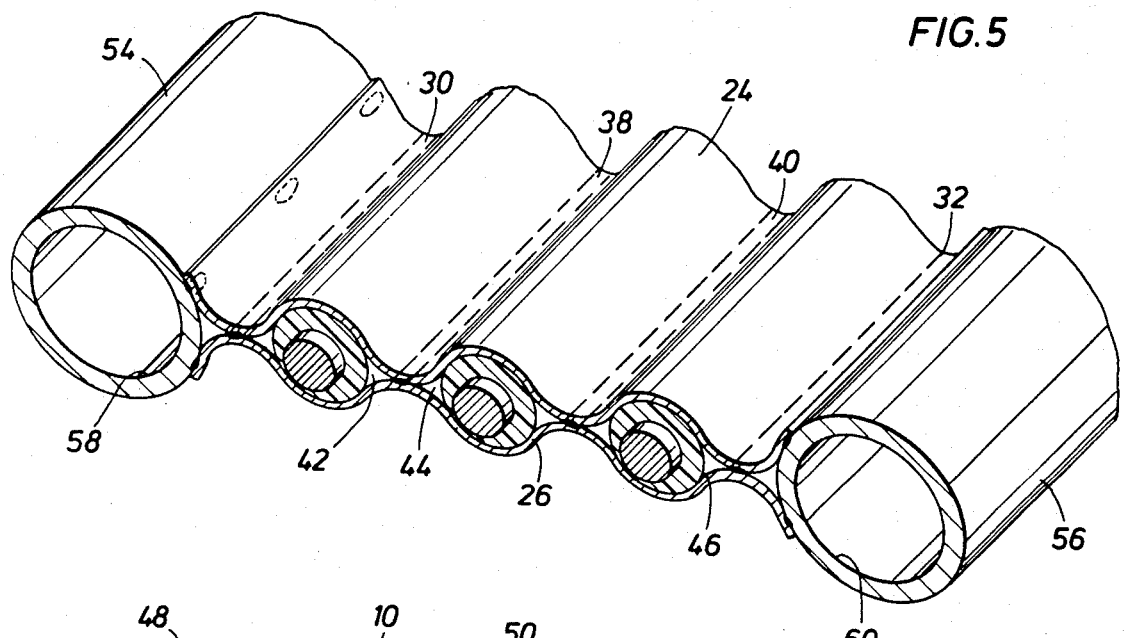
FIG.5
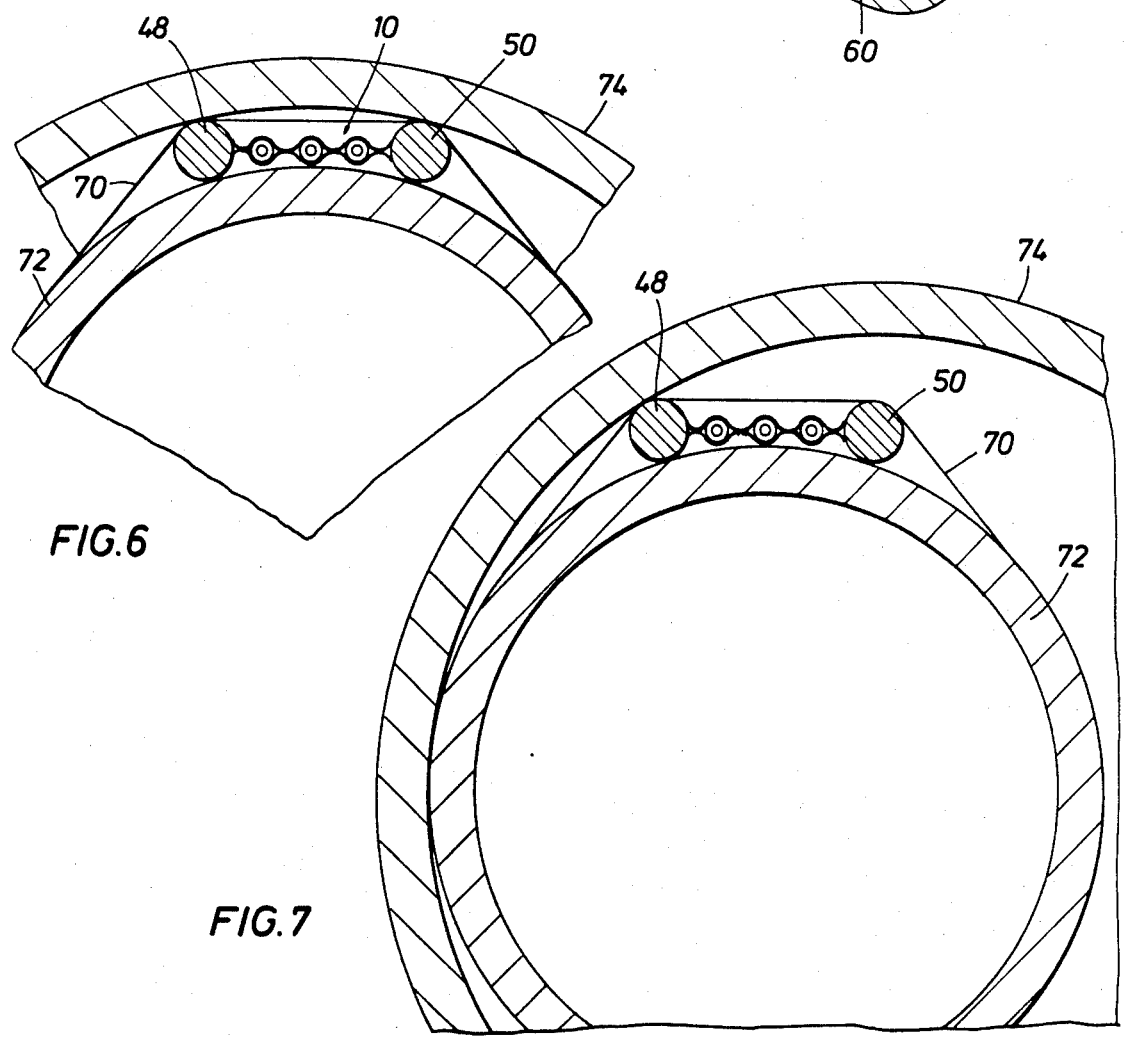
FIG.6
FIG.7

PROTECTIVE JACKET ASSEMBLY

This application is a continuation-in-part of application Ser. No. 691,483, filed Jan. 14, 1985, now abandoned, which was a continuation of Ser. No. 575,218, filed Jan. 30, 1984, now abandoned, which was a continuation of Ser. No. 453,360, filed Dec. 27, 1982, now abandoned, which was a division of Ser. No. 247,526, filed Mar. 25, 1981, now abandoned, which was a continuation-in-part of 000,017, filed Dec. 29, 1979, now abandoned.

FIELD OF THE INVENTION

This invention relates generally to downhole well apparatus for oil and gas production and more specifically to a protective jacket assembly for the prevention of damage to fluid and/or electrical conductors installed in oil and gas wells. More particularly, it concerns the protection of fluid and electrical conductors from damage due to abrasive, crushing, impact and tensile forces encountered in the bore holes of oil and gas wells. It also particularly concerns the protection of electrical conductors from fluids and pressures encountered in the bore holes of oil and/or gas wells.

BACKGROUND OF THE INVENTION

The greatest single problem encountered in producing oil and gas wells is corrosion. Substantially all oil and gas wells produce water in varying amounts. They also produce either hydrogen sulfide or carbon dioxide, with the latter being the most common. These are soluble gases and when hydrogen sulfide is mixed with water it produces hydrosulfonic acid. When carbon dioxide is mixed with water it produces carbonic acid. Each of these acids is highly corrosive to ferrous metals.

Bottom hole temperatures in excess of 200° F. are common in oil and gas wells and temperatures of that magnitude accelerate the corrosive effect of both acids. The severity of the corrosion problem is illustrated by those wells where the production tubing must be replaced at six month intervals.

When an oil well declines in production it usually ceases to flow naturally. When this occurs it is necessary to pump the oil from the production zone to the surface. The most efficient way to produce a large volume of fluid from the well is to use an electrically operated submergible pump unit which consists of an electric motor mounted on a pump which is attached to the down-hole end of the production tubing.

Electric powered oil well pumps frequently utilize high horsepower motors designed to operate on high voltage and low current. Accordingly, the power cable usually has conductors which are small in diameter and have thick insulation. Even if there is only slight degradation of the conductor insulation, a transient voltage "spike" in the electric power system may initiate corona. If, for example, a 4,160 volt pump motor is utilized, the operating voltage approximates the corona initiation voltage. Moreover, it takes less voltage to maintain corona than it does for it to be initiated. Therefore, once the corona is initiated, 4,160 volts may sustain it and this will cause rapid acceleration of the degradation of the insulation. The corona problem is further aggravated by the permeability of thermoplastics and elastomers used for insulation because both of these materials tend to degrade when exposed to fluids in a well bore.

The electric power cable which conducts electricity from a surface source to the motor is strapped to the outside of the tubing. When installed in this manner it is in the annulus between the interior of the casing and the exterior of the tubing. As previously mentioned, the annulus of a producing oil well is generally filled with completion fluid. In a well 10,000 feet deep—which is not uncommonly deep—the pressure exerted by the fluid column would be approximately 5,000 p.s.i. at the bottom of the annulus. The temperature at the bottom of the annulus in a well 10,000 feet deep would, of course, depend upon its location, but it would rarely be less than 200° F. and often would be greater. Deeper wells have greater pressures at the bottom of the annulus and greater temperatures as well. As most shallow production has been discovered, the trend is to drill deeper wells with correspondingly adverse bottom hole conditions.

Substantially all conductor insulation used in down hole power cables is either an elastomers and thermosplastics—including those so-called impermeable elastomers and thermoplastics—are in fact permeable. Heat in excess of 200° F. accelerates their degradation and their insulations are also particularly vulnerable to fluid under pressure because of their relatively low specific gravity.

In a high pressure wet environment such as that encountered at the bottom of an oil well, conductor insulation will fail because the pressure will force the fluids through the insulation into contact with the conductors and thus cause a short circuit. When bottom hole temperatures of 200° F. or more are added to the above conditions the process accelerates.

If the conductor insulation fails in a down-hole pump, the tubing must be removed and reinstalled with new conductors. As previously stated, depending upon local conditions, either a drilling rig or a completion rig must be used to remove and reinstall the tubing. During this period the well is obviously not producing.

Wholly aside from the down hole conditions which adversely affect electric power cable, the process of installing the cable often results in its damage before it can be placed in service. As previously described, the cable is attached to the tubing which is inserted into the well bore. During the installation process the cable will be rubbed against the inside of the steel casing and may be abraded or actually cut. In this context, it must be recognize that lengths of casing are joined together by a casing collar which screws over the abutting ends. Generally, the two ends are not in contact with one another and this results in a gap in which the casing ends form a cutting edge when the insulation is forced against them.

Frequently the power cable is crushed between the tubing string and the inside of the casing. This occurs in the case of deviated offshore wells where the well bore extends laterally a distance of several thousand feet from the well site or production platform. In this situation the tubing may rest on the power cable at the bend section of the casing or grind the power cable against the bent section during installation.

Another frequent cause of power cable failure is deterioration of the cable insulation by the effect of electrical discharge which is referred to as "corona". Corona is defined as a "partial discharge" of electrical energy. Corona results from the dielectric breakdown of a portion of the path between two conductors with a voltage difference between the conductors. This discharge is always in the gaseous portion of the path between the conductors and is not present in the solid insulation material. When a voltage is applied to an electrical power system, portions of this voltage appear across each insulating segment of the power circuit. When the voltage across the air gap exceeds the dielectric breakdown strength of that particular thickness of air, breakdown of the air occurs, the air becomes conductive and this conductive nature of air is known as corona. The required voltage on the system for corona starting is dependent on a number of factors, including density of the air, the thickness of the air gap, the shape of the electrodes, the dielectric constant of the solid insulation and the thickness of the insulation. Moreover, where one of the conductors presents a sharp edge, projection, etc., the corona discharge will develop at a much lower starting voltage and will be maintained at a much lower operating voltage than if the electrodes present smooth surfaces across the air gap.

In order for corona discharge to develop, the voltage difference between the conductors must have a predetermined value, typically referred to as "starting voltage", in order for the air between the conductors to break down and become conductive. After the corona has developed, it is maintained at a much lower "maintenance voltage" between the conductors. When power circuits are operated at a voltage lower than starting voltage of the corona discharge, it would seem that corona discharge could not develop and the power system would thus be free from damage by the effect of corona. Even in such circuits, however, the voltage spikes and surges that occur in normal operation are typically sufficient for corona initiation. Once initiated, the corona continues until such time as the voltage difference across the conductors becomes insufficient for continuation. Since the insulating material for most conductors is typically a flexible elastomeric or thermoplastic, it is generally considered that the effects of corona cause deterioration and breakdown of the insulation causing cracks and deficiencies that may render the cable unserviceable. It is thus desirable to provide an electrical power cable that is free from corona discharge at all voltage levels. Where air is present within the cable, the cable shielding should be free from sharp internal edges and projections and should present an internal surface configuration which is not conducive to initiation and maintenance of corona discharge. In the alternative, or in addition to the provision of a specifically designed internal cable configuration, it may be desirable to eliminate any gaseous medium and thus effectively prevent the development of corona discharge.

In summary, as a well begins to decline in production it becomes corrosive and, when the decline reaches the point where it no longer flows to the surface naturally, it must be pumped. In the case of a corrosive well, the inhibitor must travel down the annulus to the bottom of the well. In the case of a submergible pump, the power cable must also travel down the annulus to the bottom of the well. In each case there is no conduit through which the inhibitor fluid or the electrical power may pass which can resist the abrasive, cutting and crushing forces of installation, and, in the case of electrical power cable, resist corona and the ambient conditions at the well bottom even in the event of a damage free installation.

In order to minimize the costly interruptions in production, as well as the deterioration of oil and gas producing equipment, it is the purpose of the present invention to provide a continuous, flexible, sealed, impervious metal chamber which affords protection against abrasive impact, crushing and tensile forces encountered in the bore hole of an oil or gas well. By means of this chamber, fluids and/or electricity may be transmitted to the bottom of the well by means of conductors which are isolated and protected from contact with the detrimental conditions existing within the bore hole.

SUMMARY OF THE INVENTION

With the foregoing in mind, it is apparent that the present invention affords a novel means by which fluid and electrical conductors may be protected in the bore hole of an oil or gas well.

It is a feature of the present invention to provide a novel protective jacket assembly that effectively shields one or more fluid conductors, such as tubes, and/or one or more electrical power or control conductors, such as wires, or a combination of one or more fluid and electrical conductors from the detrimental conditions and forces occurring within the well bore of an oil or gas well.

It is a novel feature of the present invention that it is sufficiently flexible for it to be wound and unwound around a reel in the process of manufacture and would around a reel which may be placed at the wellsite and unwound into either a straight or a deviated bore hole of an oil or gas well.

Another novel feature of the present invention is that the jacket assembly provides a sealed metal sheath which protects the fluid and/or electrical conductors from abrasion, crushing pressure and fluids commonly encountered within the well bore of an oil and/or gas well.

Another novel feature of the present invention is that it may be constructed so as to form a continuously sealed uninterrupted impervious flexible chamber as long as the depths usually encountered in oil or gas wells so that fluids and/or electricity may be conducted to the bottom of the bore hole without the fluid or electrical conductors being damaged by conditions within the well bore.

Another novel feature of the present invention is that the sealed flexible metal sheath is itself protected against abrasion, crushing and impact within the bore hole of an oil or gas well by longitudinal protective elements which also provide tensile support so that the assembly will be self-supportive at the great depths encountered in oil or gas wells.

Another novel feature of the present invention is that the jacket assembly will fit within the annulus of commonly completed oil or gas wells when containing a multiplicity of fluid and/or electrical conductors and not interfere with the installation of the production tubing.

Another novel feature of the present invention is that the sealed sheath may contain a combination of electrical power conductor wires and/or fluid injection tubing without requiring any material variation in the jacket assembly.

Another novel feature of the present invention consists of a protective metal sheath which is specifically constructed so as to reduce or eliminate the development of corona discharge that might be initiated and maintained between the conductors and the protective sheath in customary usage.

Another novel feature of the present invention is multi-electrical conductors having external shielding which does not present internal sharp edges that might otherwise assist in the initiation of corona discharge.

Another novel feature of this invention is a protective sheath which is impervious to fluids and which encapsulates electrical conductors.

Other and further objects, advantages and features of the present invention will become apparent to one skilled in the art upon consideration of this entire disclosure. The form of the invention, which will now be described in detail, illustrates the general principles of the invention, but it is to be understood that this detailed description is not to be taken as limiting the scope of the present invention.

In accordance with the present invention a protective jacket assembly is provided which consists of a protective metal sheath to which are attached longitudinal structural elements on both sides.

The metal sheath is formed from two uninterrupted continuous elongated sheets of metal strip which are formed to define either one or a plurality of spaced grooves having a generally semi-circular configuration. When the so-formed metal sheets are brought into receiving relationship with the fluid and/or electrical conductors, the grooves will form a top and bottom covering which will conform to and be in contact with one another at the flat spaces between the conductors. The metal sheets are continuously welded together along their planes of contact at the outermost edges so as to form an uninterrupted seal which is co-extensive with the sheath. When the welded sheath is attached to the bottom of the tubing in sealed relationship, the metal sheath forms a continuous uninterrupted, flexible, sealed chamber which is impervious to fluids and thus protects the fluid and electrical conductors. The planes of contact of the metal sheets which are between the conductors may also be continuously welded together so as to form separate sealed chambers, but if not so desired they are welded together intermittently.

As production tubing, with the protective jacket assembly hereof attached thereto is run into or removed from a well, the tubing and protective jacket assembly will be subjected to abrasive activity due to rubbing along the inner surface of the well casing. If the metal sheath of the protective jacket assembly completely enveloped the longitudinal structural elements, portions of the metal sheath would be subjected to abrasion and scraping due to contact with the abrasive inner surface of the casing. The relatively thin sheet metal could be worn through by this abrasive activity or could become torn due to the scraping action that occurs as the protective jacket assembly is passed over the sharp internal edges of the casing joints. Under circumstances where the casing is bent, such as when well bore deviations are developed, the abrasive and scrapping activities are accentuated, thus presenting greater hazards to the protective jacket assembly. For these reasons, it is necessary that the metal sheath of the protective jacket assembly be protected from abrasion or scraping as it is moved through the well casing during running and retrieving operations. It is further necessary that the structural connection between the metal sheets and the longitudinal structural members be located in an area of the structural members that will be protected from contact with the casing. FIGS. 1, 6 and 7 illustrate that the metal sheath is attached to the longitudinal structural elements in a manner that prevents obstructions inside the well bore from tearing the metal sheath away from the longitudinal structural members. FIGS. 1, 6 and 7 also illustrate how the metal sheath incorporates the conductors, but does not encapsulate the longitudinal structural members, thereby eliminating the exposure of the protective sheath to obstructions or other hazards in the casing.

In order to protect the metal sheath against abrasion, crushing, tearing and similar hazards, the longitudinal structural elements are welded to each side of the sealed sheath. The structural elements will be uninterrupted, continuous metal rods or tubes. The inside part of the structural elements will be welded to the edge positions of the sheath so that they may be attached to, but not be encompassed by the metal sheath. By this construction, abrasive or cutting forces applied against the longitudinal members will not damage the metal sheath as would occur if it encompassed the structural elements.

As needed, the diameter of the longitudinal structural elements is larger than the thickness of the metal sheath which encloses the conductor or conductors. The protective jacket assembly will be attached to the tubing so that both will be installed in the well bore at the same time. The longitudinal structural elements will prevent the metal sheath from being crushed between the tubing and the casing or from being abraded by forced contact against the irregular interior surface of the casing when they are installed in either vertical or deviated wells. The longitudinal structural elements also provide tensile strength for the metal sheath and the enclosed conductors so that its own weight will not cause it to break when installed in a deep well.

When continuous uninterrupted tubing is used for the longitudinal structural elements, the tubing may also provide fluid supply and return lines, a manometer line, hydraulic lines or serve other suitable purposes depending upon the requirements of the particular well.

To prevent the development of corona discharge between the conductors and the insulated protective covering of the cable, any void between the insulation of the electrical conductors and the metal protective sheath is filled with a dielectric medium, such as silicone oil, which eliminates any air through which corona discharge might develop. As a further protection against the development of corona discharge, each of the metal sheets is of smoothly curved configuration, thus preventing no internal edges which would facilitate low voltage corona initiation.

When alternating current electrical conductors are encapsulated in the metal protective sheath, it is preferred that the protecting metal sheath material be made of a nonferrous metal or any metal which does not contribute to inductive electrical power losses in the electrical power conductors contained in the protective sheath.

BRIEF DESCRIPTION OF THE DRAWINGS

So that the manner in which the above recited features, advantages and objects of the invention, as well as other, which will become apparent, are attained and can be understood in detail, a more particular description of the invention, briefly summarized above, may be had by reference to the embodiment thereof illustrated in the appended drawings, which drawings form a part of this specification.

It is to be noted, however, that the appended drawings illustrate only a typical embodiment of the invention and are not to be considered limiting of its scope, for the invention may admit to other equally effective embodiments.

IN THE DRAWINGS

FIG. 1 is a cross-sectional view of the protective jacket assembly constructed in accordance with the present invention in which are enclosed the electrical conductors to provide power to the well bottom for such purposes as operating an electrically powered pump.

FIG. 2 is a cross-sectional view of the protective jacket assembly constructed according to this invention and which encloses a tube for such purposes as conducting a corrosion inhibitor or other fluid to the well bottom.

FIG. 3 is a partial cross-sectional view of the protective jacket assembly constructed according to this invention and which encloses a plurality of insulated electrical conductors surrounded by insulating material.

FIG. 4 is an isometric view of the protective jacket assembly of FIG. 1 illustrating periodic resistance welds as one suitable means of establishing interconnection between the metal sheets which form a protective sheath.

FIG. 5 is an isometric view of the protective jacket assembly of FIG. 1 and illustrates the utilization of tubing for the longitudinal structural members.

FIGS. 6 and 7 are cross-sectional views illustrating the inside of the casing of an oil or gas well in which the protective jacket assembly is attached to the production tubing and further illustrating how the protective jacket assembly protects the fluid or electrical conductors from damage by contact with the interior of the casing.

Figure 8:
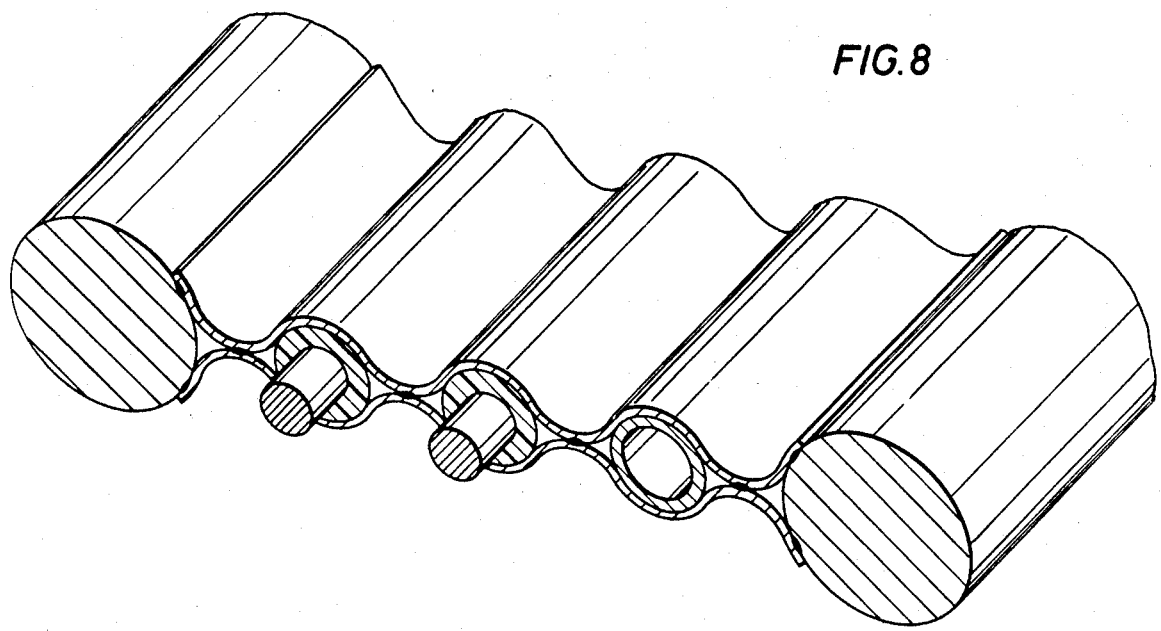

FIG. 8 is a partial isometric view of the protective jacket assembly constructed in accordance with the invention and illustrating the encapsulation of both electrical and fluid conductors within the metal protective sheath.

Figure 9:
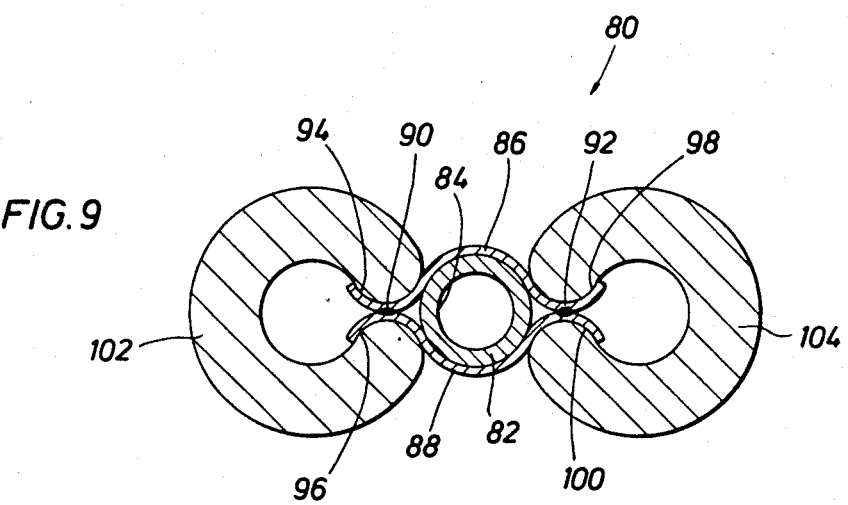

FIG. 9 is a cross-sectional view of the protective jacket assembly constructed in accordance with this invention and illustrates an alternative form of the longitudinal structural members.

Figure 10:
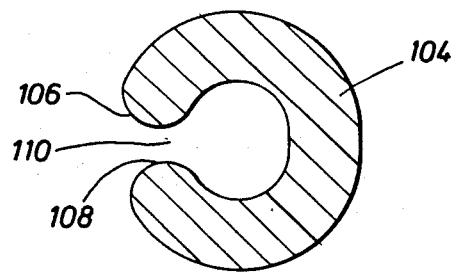

FIG. 10 is a cross-sectional view of the longitudinal structural members of FIG. 9.

Figure 11:
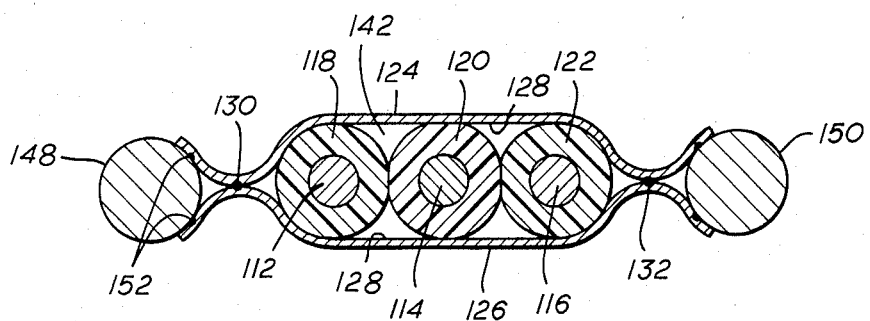

FIG. 11 is a view of an embodiment similar to the embodiment shown in FIGS. 1–5.

Figure 12:
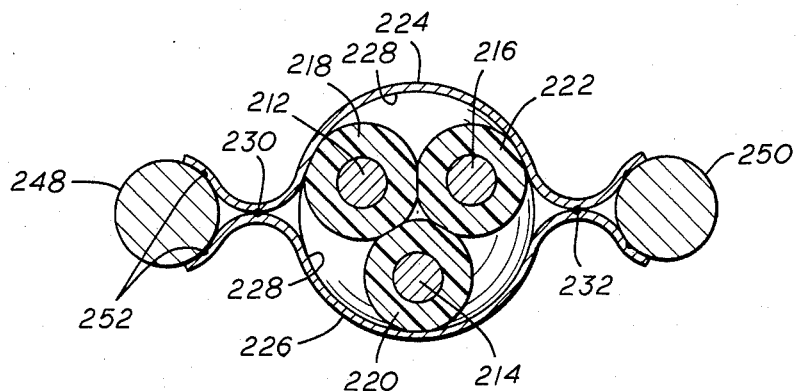

FIG. 12 is a view showing a variation of the structures shown in FIGS. 2, 3 and 9.

DETAILED DESCRIPTION OF PREFERRED EMBODIMENTS

The present invention relates to a protective jacket assembly which is capable of withstanding the hazards usually found in oil and gas wells. The protective jacket assembly provides protection for electrical, fluid or a combination of electrical and conductors for such uses as powering down hole pumps and injecting corrosion inhibitors into the tubing.

Referring now to the drawings and first to FIG. 1, a protective jacket assembly, illustrated generally at 10, is shown to incorporate a plurality of electrical conductors 12, 14 and 16 that are oriented in generally parallel spaced relation. As shown, the protective jacket assembly 10 encapsulates three electrical conductors, but it is to be understood that any number of conductors may be employed within the spirit and scope of the present invention. Conductors 12, 14 and 16 may be formed of any suitable conductive material, such as copper, aluminum, etc., and may be either solid conductors or multistrand conductors. Additionally, one or more of the conductors 12, 14 and 16 may be composed of a plurality of insulated electrical wires, such as might be employed for purposes of electrical control. Each of the conductors is provided with coverings 18, 20 and 22 of suitable electrical insulation material that is capable of providing the desired dielectrical characteristics required for proper operation of the electrical circuitry. The insulation material may be composed of any one of a number of suitable commercially available insulation materials within the spirit and scope of the present invention. Where operation at elevated temperatures is expected, one suitable insulation material may be polytetrafluroethylene, which is sold under the registered trademark Teflon, specifically FEP or PFA Teflon, by E. I. Dupont de Nemours & Co. of 1007 Market Street, Wilmington, DE 19898.

The protective jacket assembly of this invention will be adapted for operation in detrimental environments, such as being wholly or partly submerged in corrosive and high temperature well fluid. In order to provide adequate protection for each of the insulated conductors against attack by detrimental materials in the environment of operation, the protective jacket assembly is provided with a protective sheath which is impermeable to liquids and gases. The protective sheath is formed of a metal, such as stainless steel, etc. It is well known that cathodic deterioration of metal parts can occur if dissimilar metals are utilized for parts in a down hole well environment. For this reason, it is desirable that the metallurgy of the various components of the protective jacket assembly be metallurgically compatable with one another and with the other down hole components of the well. Even in the corrosive environment of a well, stainless is an appropriate choice for the thin metal sheets and longitudinal structural elements of the protective jacket assembly, because this material is compatible in the metallurgical sense with the production tubing and well casing, which are typically composed of mild steel. As shown in FIG. 1, the protective sheath is defined by upper and lower metal sheets 24 and 26, each being formed to define a plurality of elongated grooves 28 within which the insulated conductors are received. The grooves 28 may be formed by roll forming flat sheet stock as it is unspooled from a storage reel and brought into receiving relationship about the insulated conductors.

It is to be noted that when the conductors to be encapsulated are alternating current electrical conductors as shown in FIG. 1 it is preferred that the protective metal sheath material such as sheets 24 and 26 are provided of a metal, such as stainless steel, which does not contribute to inductive electrical power losses in the electrical power conductors.

It is desirable for the outside edges of the protective metal sheath to be sealed in order to prevent fluids from entering the metal sheath within which the electrical or fluid conductors are encapsulated. As illustrated in FIG. 1, the metal sheets 24 and 26 are brought into intimate contact immediately outside of each of the outermost conductors. At these outside areas of intimate contact the metal sheets are joined by welding so as to define an elongated continuously sealed area at the outside of each of the outermost conductors. As shown in FIGS. 1 and 4, which depict the metal protective sheath portion of the protective jacket assembly, the elongated sealed areas are joined by resistance welding at 30 and 32.

The fluid impermeable metal sheets 24 and 26 are brought into intimate engagement between each one of the insulated conductors, as shown in FIGS. 1 and 4, and positive interconnection between the metal sheets is established by means of a plurality of short resistance welds, such as shown at 34 and 36. The intermediate structural interconnection established by these short resistant welds lends structural integrity to the protective sheath and maintains the protective sheath in intimate retaining engagement about each one of the electrical conductors.

Referring now to FIG. 5, the protective jacket assembly is shown encompassing the electric power conductors to provide three phase power and represents one of the embodiments of the present invention. The protective jacket assembly of FIG. 5 is essentially identical to the structure illustrated in FIGS. 1 and 4 except that the metal sheets 24 and 26 are secured intermediate the insulated conductors by means of continuous resistance welds 38 and 40. When welded in this manner, the intermediate resistance welds together with the outside resistance welds 30 and 32 establish a plurality of sealed compartments 42, 44 and 46 with the insulated conductors being received within the compartments. Each of the compartments is sealed by the elongated resistance welds 38 and 40 with respect to the adjacent compartments.

Corona discharge develops across air gaps and it is desirable to eliminate air from the interior of the protected jacket assembly. In accordance with the present invention, a suitable non-gaseous dielectric medium, such as silicone oil, for example, is utilized to displace air that might be present in the spaces that are define between the conductors and the protective sheath. As shown in FIG. 1, elongated generally triangular spaces or voids are defined by the structural relationship between the protective sheath and the conductors. Silicone oil, or some other suitable dielectric medium, may be utilized to displace any air from these elongated voids. The dielectric medium may be introduced into these by pumping after the protective sheath has been applied to conductors and joined by resistance welding as described above. Corona discharge will not occur without the presence of air or some other gaseous medium. The protective jacket assembly of this invention will, therefore, eliminate corona discharge when manufactured in this manner. When no dielectric fluid is used, corona discharge will be lessened but not eliminated.

As explained above, it is necessary for the protective sheath to be free of any sharp edges or projections that might enhance corona discharge. In accordance with the present invention, the upper and lower metal sheets 24 and 26 are formed as shown in FIG. 1 to define smoothly curved sections having no sharp internal edges or projections. The resistance welded connections at various points between the metal sheets serve to interconnect the sheets and do not define any sharp edges or projections. Under circumstances where it is not desirable to fill the triangular voids with a dielectric medium as described above, the configuration of the protective sheath effectively retards development of corona discharge at operating voltage levels.

As indicated above, protection is provided for the protective sheath to prevent damage when it is subjected to crushing forces between objects or is forcibly struck by objects to which it might be exposed. In order to prevent damage to the protective sheath by crushing, longitudinal structural elements are affixed to the protective sheath in the manner illustrated in FIGS. 1, 4 and 5. As shown in FIGS. 1 and 4, the uninterrupted longitudinal structural elements are metal rods 48 and 50. As shown in FIG. 4, the metal rods 48 and 50 are affixed to the protective sheath by a plurality of short resistance welds 52 or, as is evident from the drawing, by continuous resistance welds.

The outside edges of the metal sheets 24 and 26 are formed so as to diverge in the manner best illustrated in FIGS. 1 and 4, and these divergent or splayed edge portions are each interconnected with the longitudinal structural elements 48 and 50 by the resistance welds 52. Other suitable means for establishing structural interconnection between the longitudinal structural elements 48 and 50 and the outside edge portions of the protective jacket assembly structure may be provided within the spirit and scope of this invention. To provide protection against mechanical damage by crushing and abrasive forces and to provide tensile strength to enable the protective jacket assembly to support itself within a well, the elongated structural elements are continuous, uninterrupted and extend the entire length of the protective jacket assembly. When desired to limit the weight of the protective jacket assembly or for other purposes, the longitudinal structural elements may be of tubular configuration as shown in FIG. 5.

It may also be desirable to cause the elongated structural elements to provide a fluid carrying function in addition to providing protection against possible structural damage to the protective sheath and providing tensile strength. Where such is desired, the protective jacket assembly may conveniently take the form illustrated in FIG. 5 where longitudinal structural elements 54 and 56 are formed to define internal passages 58 and 60, respectively. Passages 58 and 60 might be employed to provide hydraulic fluid energization. For example, where hydraulic mechanisms are employed, the passages 58 and 60 might serve as hydraulic supply and return passages for accomplishing a suitable hydraulic operation under control initiated at a wellhead control facility. The passages 58 and 60 may also be employed as flow passaged if desired. The protective jacket assembly may also include any suitable combination of electrical conductors and tubular fluid transporting conductors such as shown in FIG. 8.

Although the longitudinal structural elements illustrated in FIG. 2 are of circular configuration, it is not intended to so limit the present invention.

Whether the longitudinal structural elements are of circular configuration or of other suitable configuration, the diameter or thickness of the longitudinal structural elements is materially greater than the thickness of the conductors. Any down hole object that is brought into contact with the protective jacket assembly will therefore contact one or both of the longitudinal structural elements without contacting the protective sheath portion of the protective jacket assembly. For example, as illustrated by the broken line at the lower portion of FIG. 1, and by FIGS. 6 and 7, an elongated element such as well casing which comes into direct contact with the protective jacket assembly will merely engage the longitudinal structural elements at each side of the protective jacket assembly. Thus, the metal sheath which is the force sensitive portion of the protective jacket assembly, will be protected from damage by mechanical elements. The metal sheath of the protective jacket assembly will be contacted and possibly damaged only when the mechanical object engaging the protective jacket assembly is not large enough to bridge across both of the longitudinal structural elements or when the protective sheath is engaged by a corner or sharp projection of a hazardous object. In a down hole application, it is virtually impossible for the metal sheath to be damaged by crushing forces because of the configuration of the protective jacket assembly.

As shown in FIG. 6 and 7, the protective jacket assembly of the present invention typically will be secured by means of straps 70 to tubing 72 that are inserted within the well casing 74 of a petroleum well. In FIGS. 6 and 7, the production tubing 72 is shown in a position where the protective jacket assembly might be subjected to crushing forces between the tubing and the casing. The elongated structural elements 48 and 50 are shown to be in engagement with both the tubing and the casing and any crushing forces that are applied will be resisted by the longitudinal structural elements. The conductor within the metal sheath portion of the protective jacket assembly will not contact the inner wall of the casing and, therefore, will be protected. As shown in FIGS. 6 and 7, the tubing 72 is shown to be positioned in contact with the well casing 74 with only the longitudinal structural element 48 of the protective jacket assembly being in contact with both the tubing and the casing. Here again, the metal sheath, which encompasses the conductors and is the force sensitive portion of the protective jacket assembly is effectively protected from damage by crushing forces or by abrasion which might otherwise occur as the tubing with the protective jacket assembly attached is moved linearly through the well casing.

As mentioned above, the protective jacket assembly is adapted to be strapped to or clamped to or otherwise attached in assembly with the production tubing. As such, the protective jacket assembly is inserted into or removed from the well in conjunction with the production tubing. When the tubing is inserted into the well, it is possible for the tubing and the protective jacket assembly to be rubbed or scraped along the inside surface of the casing. Where the well defines a deviated bore, as is the case with many offshore wells, the tendancy for the production tubing and the protective jacket assembly to be scraped along the inside of the casing becomes more prevalent.

Usually casing is made up by screwing abutting joints of casing into a casing collar or coupling. The casing collar allows the ends of the casing joints to be spaced to some extent. The casing ends are often sharp and, thus present circular cutting edges that tend to gouge and cause severe abrasion of objects that are inserted into the well. It is desirable, therefore, to provide a protective jacket assembly that may be subjected to such casing joint scraping and abrasion without being damaged.

The elongated structural elements are affixed to opposed side edges of the metal sheath and the present metal wear surfaces that may contact the inside surface of the casing without permitting the metal sheath to be contacted. The elongated structural elements, therfore, provide a wear resisting feature as well as preventing the metal sheath and encapulated conductors from being scraped, cut or abraded by virtue of contact with the casing during installation or removal of the tubing.

With reference now to FIG. 9, another convenient from of the present invention is illustrated wherein elongated structural elements are retained in assembly with the protective sheath by mechanical interlocking engagement rather than by resistance welding. As shown in FIG. 9, the structure illustrated incorporates conductor means which may be a single fluid conductor, as illustrated at 82, form a flow passage 84 to enable fluid to be transmitted through the conductor. In the alternative, the conductor means may conveniently take the form of a plurality of fluid conductors, one or more electrical conductors or a combination of electrical conductors, and fluid conductors. About the conductor means is provided a protective sheath of metal which is defined by a pair of metal sheets 85 and 88 that are interconnected adjacent the outer portions thereof by means of welds 90 and 92 such as may be formed by continuous resistance welds. The resistance welds are formed as the sheet material and conductor means are fed simultaneously through protective jacket assembly apparatus. The outer edge portions of each of the metal sheets are positioned in diverging manner, thus cooperating to define a pair of opposed edge grooves at each side edge of the elongated protective sheets. These opposed pairs of edge grooves are shown at 94 and 96 at one side of the metal sheath and 98 and 100 at the opposite side thereof.

A pair of longitudinal structural elements are provided as shown as 102 and 104 which are generally of "C" shaped configuration when viewed in cross-section and, as illustrated in FIG. 9, define edge surfaces 106 and 108 that cooperate to define an elongated groove 110 therebetween. The rounded configuration of the edge portions 106 and 108 of the structural elements substantially correspond to the rounded configuration of the curved metal protective sheets 86 and 88 that define the edge grooves 94–100. In the initial condition thereof, the edge portions 106 and 108 of the structural elements 102 and 104 are sufficiently spread apart that the assembled edge portions of the metal sheath are readily positioned through the groove 110 and, thus the rounded edge surfaces 106 and 108 are positioned adjacent the respective rounded edge grooves 94–100. The elongated metal structural elements are then deformed such as by rolling operations, thus bringing the edge surfaces 106 and 108 thereof more closely together and, thus positioning the opposed edges within the respective edge grooves of the conduit structure. After this has been accomplished, the configuration of the conduit structure will appear as shown in FIG. 9 and the longtudinal structural elements 102 and 104 will be positively interlocked in mechanical assembly with the shielded protective jacket assembly and will be retained in such interlocked assembly by means of the structural integrity of the material from which the structural elements are composed. The longitudinal structural elements may be composed of any compatible metal to provide the protective activity that is intended.

By employing a mechanical interlocking mechanism to secure the structural elements 102 and 104 in assembly with the protective metal sheath 86 and 88, it is not necessary to conduct resistance welding operations to attach the longitudinal structural elements. The structural elements 102 and 104 provide elongated wear surfaces that may be scraped or rubbed along the inside surface of the casing without being damaged. Further, the structural elements 102 and 104 are thicker than the protective sheath so that the protective sheath will be effectively protected against damage in the event crushing forces are applied to the protective jacket assembly.

FIG. 11 illustrates an alternate embodiment of the protective sheath shown in FIG. 1. As shown in FIG. 11, the protective sheath is defined by upper and lower metal sheets 124 and 126 each being formed to define a single elongated groove 128 within which the insulated conductors are received as shown. The grooves 128 may be formed by roll forming flat sheet stock as it is unspooled from a storage reel and brought into receiving relationship about the conductors.

It is desirable for the outside edges of the protective metal sheath to be sealed in order to prevent fluids from entering the metal sheath in which electrical or fluid conductors are encapsulated as illustrated in FIG. 11, the metal sheets 124 and 126 are brought into intimate contact with conductors 112, 114 and 116 contiguously grouped and disposed wherein the metal sheets are rolled into intimate contact, immediately on the sides and ends of the conductors as grouped. At the outside areas of intimate contact the metal sheets are joined by welding so as to define an elongated, continuously sealed area around the outside of the linearly disposed conductors. As shown, the elongated sealed areas are joined by resistance welding at 130 and 132. When welded in this manner, the resistance wells establish a sealed compartment 142 with the group of insulated conductors being received within this compartment.

In accordance with the present invention, a suitable non-gaseous dielectric medium, such as silicon oil, for example, may be used to displace air that might be present in spaces remaining between the conductors and the protective sheath. The dielectric medium may be introduced by pumping after the protective sheath has been applied to the conductors and joined by resistance welding as described above. Corona discharge will not occur without the presence of air or some other gaseous medium.

In accordance with the present invention, the upper and lower metal sheets, 124 and 126 are formed as shown in FIG. 11 to define smoothly curved sections having no sharp internal edges or projections. The resistance welded connections at various points serve to interconnect the sheets and do not define any sharp edges or projections. As described above the configuration of the protective sheath effectively retards development of corona discharge at operating voltage levels.

The conductors 112, 114, 116 may be formed of any suitable conductive material such as copper, aluminum, etc., and may be either solid conductors or multi-strand conductors. Each of the conductors is provided with the coverings 118, 120 and 122 of suitable electrical insulation material capable of providing the desired dielectric and physical characteristics required for proper assembly as shown and for proper electrical operation. Such wiring is discussed more fully with reference to FIG. 1. The uninterrupted longitudinal structural elements of FIG. 11 are metal rods 148 and 150. Metal rods 148 and 150 are affixed to the protective sheath by a plurality of short resistance wells 152 or, as evidenced from the drawing, by continuous resistance wells.

The outside edges of the metal sheets 124 and 126 are formed so as to diverge in the manner best illustrated in FIGS. 1, 4 and 11. These divergent or splayed edge portions are each interconnected with the longitudinal structural elements 148 and 150 by the resistance welds 152. While it is desirable that the structural elements 148 and 150 are provided as large as feasible, the invention is workable and very practical when the rods 48 and 52 are about the same as or smaller than the sheath formed between the rods. It is axiomatic however, that the rods be of such strength as will support the designating length of the assembly within a well bore or the like.

The conductors shown in FIG. 11 alternately could be furnished as hollow tubes (not shown) to serve in the same function as described with reference to FIG. 2. Also, the rods 148 and 150 can be furnished as hollow tubes (not shown) for uses as described for the tubes 54 and 56 of FIG. 5.

FIG. 12 illustrates an embodiment of the invention very similar to the invention which has been previously described with reference to FIG. 1 and FIG. 11. In this embodiment, conductors 212, 214 and 216, as furnished with insulation 218, 220 and 222, are linearly disposed in twisted or spiral configuration within the sheath which is defined by upper and lower metal sheets 224 and 226, each being formed to define a single semi-circular groove 228 within which the twisted insulated conductors 212, 214 and 216 are received into close fitting relationship. As illustrated in FIG. 12, the metal sheets 224 and 226 are brought into intimate contact immediately outside of the bundle of twisted conductors. At these outside areas of intimate contact, the metal sheets are joined by welding so as to define an elongated continuously sealed area outside the conductors. As shown, the elongated sealed areas are joined by resistance welding at 230 and 232. The metal sheets 224 and 226 are joined to uninterrupted longitudinal structural elements shown as metal rods 248 and 250. As shown, the metal rods 248 and 250 are affixed to the protective sheath by plurality of short resistance wells 252 or, as is evidenced in the drawing, by continuous resistance wells. The outside edges of the metal sheets 224 and 226 are formed so as to diverge in the manner best illustrated in FIG. 12 and these divergent or splayed edge portions are each interconnected with a longitudinal structural elements 248 and 250 by the resistance wells 252.

Hollow conduits or tubes (not shown) may be substituted for the conductors 212, 214 or 216, or any of them, and serves to function as previously described for the tube 29 in FIG. 2.

The structural rods 248 and 250 may be also substituted with hollow tubes (not shown) much in the same manner as shown and described for the tubes 54 and 56 in FIG. 5.

To avoid corona effect, the remaining spaces between the conductors 212, 214 and 216 may be filled with a silicone oil as previously described with reference to FIGS. 1 and 11.

As hereinafter discussed under caption "Preferred Method of Manufacture", when the protective jacket assembly is manufactured it is spooled onto a reel for either storage or transportation to the well site. When installation is desired the reel is mounted so that the protective jacket assembly may be unwound from the reel and attached to the tubing so that the both may be installed together inside of the well casing. Therefore, the protective jacket assembly must be sufficiently flexible to be able to withstand reeling and unreeling during manufacture and installation and also be sufficiently flexible to bend to the same extent as a deviated well into which it may be installed. This requires that each of the various components of the protected jacket assembly also be sufficiently flexible to withstand frequent bending in manufacture and installation without developing destructive stresses. Moreover, the longitudinal structural elements, the metal sheath and the encapsulated conductors are positioned with respect to one another so that their respective center lines may be intersected by a common transverse line. This latter feature eliminates the development of excessive stresses which would otherwise occur in reeling and unreeling the protective jacket assembly.

The protective jacket assembly encapsulates electric power conductors and/or fluid conductors and effectively protects them from damage from impact or abrasion when the protective jacket assembly is installed in the well casing. The elongated structural assembly is installed in the well casing. The elongated structural elements on each side of the protective metal sheath absorb impact and abrasive forces so that the metal sheath is not damaged. In this manner the continuous, impervious, sealed chamber which is formed by the metal sheath is protected from damage and, in turn, protects the encapsulated conductors from being damaged.

The edges of the elongated metal sheets which form the metal sheath are attached to the inner sides of the longitudinal structural elements so that no part of the metal sheath is exposed to contact against the casing when the protective jacket assembly is installed in the well. The longitudinal structural elements are not encapsulated by the metal sheath and the metal sheath is connected to the longitudinal structural elements at areas which are protected by the structural elements as illustrated at 52 of FIG. 1 and FIG. 9.

The protective jacket assembly is also resistant to the effects of corona discharge because the protective metal sheath does not present any internal sharp projections or sharp edges that might cause low voltage corona initiation should air or other gaseous material be contained within the protective jacket assembly. If desired, the protective metal sheath may be made completely free of any air or gaseous material by filling the interstices between the sheath and the electrical conductors with a suitable dielectrical material, such a silicone oil. Thus, it is evident that we have provided a novel protective jacket assembly for use in oil and gas wells that effectively resists the development of corona discharge and, therefore, the insulation material surrounding the electrical conductors within the protective jacket assembly will not be susceptible to corona induced deterioration. Consequently, the effective service life of the electrical conductors will be extended.

PREFERRED METHOD OF MANUFACTURE

The protective jacket assembly is made preferably in four stages.

The first stage requires that the elongated metal strips, which are to be used to construct the protective metal sheath, be roll formed to the grooved configuration illustrated in 24 and 26 of FIG. 1. After the metal strip has been roll formed it is reeled onto a storage reel.

The second stage involves the assembly of the protective metal sheath with the conductors included therein. This is accomplished by positioning two reels containing the formed metal strip so that when the metal strips are brought together they form a tube or tubes as illustrated in FIGS. 2, 11 and 12. The formed metal strip is unreeled and conveyed by rollers to an assembly station which consists of a series of opposed rollers which hold the metal sheets in assembly. One metal sheet travels to the assembly station from above the line of travel through the assembly station and the other travels below the line of travel through the assembly station. At the point of joinder, the metal strips from a horizontal "V". The conductor lines enter the assembly station between the upper and lower roll formed metal strips so that when the assembly rollers have the metal strips joined so as to form a tube or tubes as indicated in FIGS. 1 and 2, the conductors will be encapsulated within the tube. The assembled metal strips then pass out of the assembly station, but are held in assembly by opposed conveyor rollers until it reaches a series of continuous seam resistance welders which establish the continuous welds illustrated in 30 and 32 of FIG. 1 and the continuous or intermittent welds illustrated by 34 and 36 of FIG. 1. The welding operation is performed while the sheath is submerged in circulating coolant, after which it is removed from the cooling shroud and reeled for storage or shipment.

As previously discussed, the longitudinal structural elements may be in the form of a tube, a solid member or be a "C" shaped member. If the latter, the third stage entails roll forming metal strip into a "C" shape and reeling it on a storage reel.

The fourth stage of manufacture depends upon whether the longitudinal structural elements are solid or tubular or whether they are "C" shaped structural elements. If the former, the tubular members, for example, enter the assembly station on the same plane as the protective metal sheath. The longitudinal structural elements are moved into assembly with the metal sheath by conveyer rollers in the same general manner as referred to in stage two. As they leave the assembly station, they are held in assembly by opposed rollers until they reach a series of continuous seam resistance welders which weld the structural elements to the metal sheath, as illustrated at 52 in FIG. 1, while the structural elements and sheath are submerged in circulating coolant. Thereafter, the protective jacket assembly travels out of the cooling shroud and is reeled for storage or shipment.

In the event of "C" shaped longitudinal structural element is used, the shaped elements are moved into assembly with the metal sheath and when in assembly the shaped element is rolled closed as illustrated in FIG. 9. Thereafter, the protective jacket assembly is reeled for storage and shipment.

It is feasible for a protected jacket assembly to be manufactured in a single stage when all of the manufacturing operations are performed together. However, quality control and manufacturing flexibility make the multi-stage method described above preferable.

Regardless of the particular method of manufacture that is involved, the resulting protective jacket assembly must be flexible.

Although specific embodiments have been described in detail hereinabove, it is to be understood that the subject invention is not in any way limited to these specific embodiments, and all obvious variations and modifications thereof are contemplated and are included within the spirit and scope of the invention defined in the appended claims.

What is claimed is:

1. For use in production of oil, gas and other fluid materials from subsurface formations, a crush and abrasion resistant protective jacket assembly adapted to be suspended in an oil or gas well which may have a corrosive, high temperature, high pressure gas and/or liquid environment, said protective jacket assembly being sufficiently flexible to permit reeling and unreeling during manufacture and installation in a well bore and bending to accommodate well bore deviation, said protective jacket assembly comprising:

(a) elongated conductor means extending in unbroken manner the length of said protective jacket assembly;

(b) a first metal sheet extending the length of said protective jacket assembly and being formed to define at least one elongated conductor groove means;

(c) a second metal sheet extending the length of said protective jacket assembly and being formed to define elongated conductor groove means, said first and second metal sheets being placed in assembly with said conductor groove means thereof cooperating to define elongated conductor passage means extending the length of said protective jacket assembly;

(d) a pair of elongated continuous welds securing said meal sheets in sealed assembly on either side of said elongated conductor passage means, said sheets and said welds cooperating to define elongated sealed protective metal sheath means extending the length of said protective jacket assembly, said metal sheath means including said elongated conductor passage therein; and (e) a pair of metal longitudinal structural elements being positioned at opposed sides of said metal sheath means and being structurally interconnected with at least one of said metal sheets, along the length thereof, said longitudinal structural elements having at least a part thereof exposed for guiding and protective contact with well casing and other objects with which it comes into contact as said protective jacket assembly is installed in or removed from a well, said longitudinal structural elements resisting crushing of said metal sheath means and said conductor means when said protective jacket assembly is located in a bore hole or in the annulus between the tubing and the casing of a bore hole, said longitudinal structural elements also resisting longitudinal compressive and longitudinal tensile forces and being capable of supporting the weight of said protective jacket assembly and conductors included therein when installed within a well.

2. The apparatus of claim 1, wherein said protective jacket assembly is of sufficient flexibility to permit reeling and unreeling during manufacture unreeling for insertion into a well bore and bending to accommodate well bore deviation.

3. The apparatus as recited in claim 1, wherein:
(a) said conductor passage means is defined by a plurality of elongated conductor passages formed cooperatively by said first and second elongated metal sheets; and
(b) said conductor means being a plurality of elongated conductors being located within said respective conductor passages.

4. The apparatus as recited in claim 3, including weld means interconnecting said elongated metal sheets between each of said conductor passage means.

5. The apparatus as recited in claim 3, including weld means interconnecting said elongated metal sheets between each of said conductor passage means and said weld means providing a seal between each of said conductor passages with respect to adjacent conductor passages.

6. The apparatus as recited in claim 1, wherein at least one of said longitudinal structural elements is a tubular member having an internal passage through which fluid is capable of flowing.

7. The apparatus as recited in claim 1, wherein said longitudinal structural elements are each solid members.

8. The apparatus as recited in claim 1, wherein said conductor means is defined at least in part by elongated metal tubes capable of transmitting fluids.

9. The apparatus as recited in claim 1, wherein said conductor means is defined at least in part by elongated insulated electrical conductors.

10. The apparatus as recited in claim 1, wherein
(a) said first and second elongated metal sheets fit with said conductor means to define small spaces proximate and on each side of the conductor adjacent the joining line of the elongated metal sheets; and
(b) said first and second elongated metal sheets define smoothly curved internal surfaces and present no sharp edges or internal projections which could cause the development of corona discharge.

11. The apparatus as recited in claim 10, wherein a non-gaseous dielectric medium fills said spaces and prevents the development of corona discharge.

12. The apparatus as recited in claim 1, wherein
(a) said elongated metal sheets define connection edges located outwardly of said welds defining said metal sheath means, said connection edges being positioned in bifurcated manner; and
(b) said longitudinal structural elements being located at least partially between said bifurcated connection edges of said elongated metal sheets.

13. The apparatus as recited in claim 1, wherein said weld means is developed by resistance welding.

14. The apparatus as recited in claim 1, wherein said conductor means and said longitudinal structural elements define longitudinal centerlines that are in substantially intersecting relation with a common transverse line.

15. The apparatus as recited in claim 1, wherein said elongated metal sheets are of smoothly curved cross-sectional configuration so as to inhibit the development of corona discharge.

16. The apparatus as recited in claim 1, wherein said metal sheets establish at least partial contact with said conductor means.

17. The apparatus as recited in claim 1, wherein
(a) each of said longitudinal structural elements define a slot along the length thereof and is deformable; and
(b) said first and second elongated metal sheets cooperate to define bifurcated connector means along the opposed edges thereof, said connector means being receivable within respective ones of said slots of said longitudinal structural elements and being mechanically interlocked in assembly with said structural elements upon deformation of said structural elements.

18. The apparatus as recited in claim 17, wherein said longitudinal structural elements being of generally "C" shaped configuration and defining opposed spaced locking edges, said structural elements being deformed transversely to shift said locking edges toward one another and position said locking edges in said interlocking relationship with said bifurcated connector edges.

19. In well production apparatus including well casing extending downwardly along a well bore to a production formation from which petroleum products are produced and wherein the production environment is of high temperature and corrosive nature, and production tubing extends from the surface of the earth to said production zone, the improvement comprising:
 (a) an uninterrupted, liquid and gas impervious crush and abrasion resistant sealed protective jacket assembly extending along said production tubing to a subsurface location of interest, said protective jacket assembly comprising;
 (b) elongated, uninterrupted conductor means extending the length of said protective jacket assembly;
 (c) first and second elongated uninterrupted metal sheets extending the length of said protective jacket assembly;
 (d) a pair of spaced welds securing said metal sheets in assembly along opposed sides thereof, said welds and said sheets cooperating to define sealed metal sheath means forming an elongated sealed conductor passage extending the length of said protective jacket assembly, said conductor means being located within said elongated sealed conductor passage of said sealed metal sheath means;
 (e) a pair of uninterrupted longitudinal metal structural elements being positioned at opposed sides and externally of said metal sheath and being structurally interconnected with at least one of said metal sheets, said longitudinal structural elements having at least a part thereof exposed for guiding and protective contact against said well casing as said tubing and protective jacket assembly is installed in or removed from said well, said longitudinal structural elements preventing crushing and abrading of said metal sheath means and said conductor means when in contact with said tubing and well casing, said longitudinal structural elements being of sufficient tensile strength to support the weight of said protective jacket assembly and included conductor means when suspended within said well.

20. The apparatus as recited in claim 19, wherein
 (a) said elongated sealed conductor passage is defined by a plurality of elongated conductor passages formed cooperatively by said first and second elongated metal sheets; and
 (b) said conductor means being a plurality of elongated conductors located within respective ones of said conductor passages.

21. The apparatus as recited in claim 20, including weld means interconnecting said elongated metal sheets between each of said conductors.

22. The apparatus as recited in claim 20, including weld means interconnecting said elongated metal sheets between each of said conductors and sealing each of said conductor passages with respect to adjacent conductor passages.

23. The apparatus as recited in claim 19, wherein at least one of said longitudinal structural elements is a tubular member having an internal passage through which fluid is capable of flowing.

24. The apparaus as recited in claim 19, wherein said conductor means is defined at least in part by elongated metal tubes capable of transmitting fluids.

25. The apparatus as recited in claim 19, wherein said conductor means is defined at least in part by elongated insulated electrical conductors.

26. The apparatus as recited in claim 19, wherein
 (a) said first and second elongated metal sheets fit with said conductor means to define small spaces proximate and on each side of the conductor adjacent the joining line of the elongated metal sheets; and
 (b) said first and second elongated metal sheets define smoothly curved internal surfaces and present no sharp edges or internal projections which could cause the development of corona discharge.

27. The apparatus as recited in claim 26, wherein a non-gaseous dielectric medium fills said spaces and prevents the development of corona discharge.

28. The apparatus as recited in claim 19, wherein
 (a) said elongated metal sheets define connection edges located outwardly of said welds defining said sealed metal sheath means, said connection edges being positioned in bifurcated manner; and
 (b) said longitudinal structural elements being located at least partially between said bifurcated connection edges of said elongated metal sheets.

29. The apparatus as recited in claim 19, wherein said weld means is developed by resistance welding.

30. The apparatus as recited in claim 19, wherein said conductor means and said longitudinal structural elements define longitudinal centerlines that are in substantially intersecting relation with a common transverse line.

31. The apparatus as recited in claim 19, wherein said elongated metal sheets are of smoothly curved cross-sectional configuration so as to inhibit the development of corona discharge.

32. The apparatus as recited in claim 19, wherein said elongated metal sheets establish at least partial contact with said conductor means.

33. The apparatus as recited in claim 19, wherein
 (a) each of said longitudinal structural elements defines an elongated slot extending along the length thereof, said longitudinal structural elements being transversely deformable; and
 (b) said first and second elongated metal sheets cooperate to define bifurcated connector means along the opposed edges thereof, said connector means being receivable within respective ones of said slots of said longitudinal structural elements and being mechanically interlocked in assembly with said structural elements upon transverse deformation of said structural elements.

34. The apparatus as recited in claim 33, wherein said longitudinal structural elements being of generally "C" shaped configuration and defining opposed spaced locking edges which form said elongated slot, said structural elements being deformed transversely to shift said locking edges toward one another and position said locking edges in said interlocking relation with said bifurcated connector edges.

35. A method of manufacturing a protective jacket assembly having longitudinal structural elements connected at opposed sides thereof, said method comprising:

(a) moving a plurality of conductors and a pair of longitudinal structural elements linearly through an assembly station;
(b) withdrawing a pair of elongated metal sheets from a metal sheet supply and simultaneously transporting said metal sheets into said assembly station;
(c) roll forming said metal sheets so as to define a plurality of grooves in each of said metal sheets;
(d) bringing said roll formed metal sheets into assembly with said conductors and said longitudinal structural elements in such manner that said grooves of each of said metal sheets receive respective ones of said conductors and the outside edge portions of said metal sheets engage respective ones of said longitudinal structural elements;
(e) establishing elongated seals between said formed metal sheets to define a protective metal sheath containing said conductors; and
(f) establishing structural interconnections between the outside edge portions of said sheath and said longitudinal structural elements.

36. The method of claim 35, wherein said elongated seals are established by continuous uninterrupted resistance welding.

37. The method of claim 35, wherein said method includes the step of filling the space between said conductors and said envelope with a dielectric medium.

38. The method of claim 35, wherein said method includes the step of establishing structural interconnections.

39. The method of claim 38, wherein said structural interconnections between said opposed portions of said protective metal sheath are established by resistance welding.

40. The method of claim 30, wherein said welded interconnections between said opposed portions of said metal sheets forming said protective metal sheath divide said metal sheath into a plurality of elongated conductor passages, each conductor passage containing one of said plurality of said conductors.

41. The method as recited in claim 35 wherein the plurality of grooves as specified comprise one groove wherein said one groove receives a plurality of said conductors.

42. The method as recited in claim 41 wherein the method further includes the step of filling the space between said conductors and said envelope with a dielectric medium.

43. The method as recited in claim 41 wherein said elongated seals are established by continuous uninterrupted resistance welding.

44. A method of manufacturing a protective jacket assembly having longitudinal structural elements connected at opposed sides thereof, said method comprising:
(a) moving a plurality of conductors linearly through an assembly station;
(b) withdrawing from a metal sheet supply and simultaneously transporting into said assembly station a pair of metal sheets roll formed so as to define in each of said metal sheets a plurality of grooves and edge flanges at each side thereof;
(c) bringing said roll formed metal sheets into assembly with said conductors in such manner that said grooves of each of said metal sheets receive the respective conductors and said edge flanges are oriented in diverging relationship;
(d) establishing elongated seals between said formed metal sheets to define a continuously sealed protective metal sheath containing said conductors;
(e) reeling said protective metal sheath onto a storage reel;
(f) withdrawing from a storage reel a protective metal sheath with conductors encapsulated therein and moving it and a pair of longitudinal structural elements linearly through an assembly station; and
(g) establishing structural interconnections between the outside edge portions of said sheath and said longitudinal structural elements.

45. The method of claim 44, wherein said elongated seals are established by continuous uninterrupted resistance welding.

46. The method of claim 44, wherein said method includes the step of filling the space between said conductors and said metal sheath with a dielectric medium.

47. The method of claim 44, wherein said method includes the step of establishing structural interconnections between opposed portions of said protective metal sheath between said conductors.

48. The method of claim 44, wherein
(a) said protective metal sheath is withdrawn from a storage supply and simultaneously transported into an assembly station;
(b) a pair of roll formed "C" shaped metal longitudinal structural elements are brought into assembly with said protective metal sheath in such manner that one of said structural elements is on each side of and encompasses said diverging edge flanges of said metal sheath; and
(c) roll forming said metal sheets so as to define a plurality of grooves in each of said metal sheets;
(d) bringing said roll formed metal sheets into assembly with said conductors and said longitudinal structural elements in such manner that said grooves of each of said metal sheets receive respective ones of said conductors and the outside edge portions of said metal sheets engage respective ones of said longitudinal structural elements;
(e) establishing elongated seals between said formed metal sheets to define a protective metal sheath containing said conductors; and
(f) establishing structural interconnections between the outside edge portions of said sheath and said longitudinal structural elements.

49. The method as recited in claim 44 wherein said plurality of grooves comprise a single groove adapted to receive the respective conductors together.

50. For use in production of oil and gas from subsurface formations, a sealed, gas and liquid impervious crush and abrasion resistant protective jacket assembly adapted to be suspended in an oil or gas well which may have a corrosive, high temperature, high pressure gas and/or liquid environment, said protective jacket assembly comprising:
(a) a pair of elongated uninterrupted metal sheets of sufficient length to extend from wellhead apparatus to a zone of interest within said well, said metal sheets being in welded assembly and defining a sealed impervious protective metal sheath extending the length of said protective jacket assembly; and
(b) a pair of uninterrupted longitudinal metal structural elements of substantially the same length as the length of said metal sheets, said structural elements and said metal sheets being structurally interconnected at inner portions of said structural elements and at edge portions of said metal sheets, said structural elements providing structural protection for said protective metal sheath to prevent well components from forcibly contacting said metal sheets, said structural elements defining abrasion resistant outer surface portions thereof exposed for abrasion and crush force resisting contact with well components during movement of said protective jacket assembly within said well.

51. The apparatus of claim 50, wherein said protective metal sheets are welded together adjacent edge portions thereof and define edge connection means, said edge connection means being welded to said inside portions of said longitudinal structural elements.

52. The apparatus of claim 51, wherein said edge connection means comprises edge flange means being provided on at least one of said metal sheets, said edge flange means being welded to said inside portions of each of said longitudinal structural elements.

53. The apparatus of claim 51, wherein said edge connection means comprises a pair of edge flanges being defined by said connected metal sheets outwardly of said protective sheath, said edge flanges being oriented in diverging relation and encompassing said inside portions of each of said longitudinal structural elements and being welded to each of said longitudinal structural elements.

54. The apparatus of claim 50, wherein said protective jacket assembly is of sufficient flexibility to permit reeling and unreeling during manufacture, unreeling for insertion into a well bore and bending to accommodate well bore deviation.

55. A sealed, gas and liquid impervious, crush and abrasion resistant protective jacket assembly comprising:
 (a) a pair of elongated uninterrupted metal sheets of sufficient length to extend from wellhead apparatus to a zone of interest within said well, said metal sheets being in welded assembly and defining a sealed protective metal sheath extending the length of said protective jacket assembly; and
 (b) a pair of uninterrupted longitudinal metal structural elements of substantially the same length as the length of said metal sheets, said structural elements and said metal sheets being structurally interconnected at inner portions of said structural elements and at edge portions of said metal sheets, said structural elements and said metal sheets being structurally interconnected at inner portions of said structural elements and at edge portions of said metal sheets, said structural elements providing structural protection for said metal sheath to prevent well components from forcibly contacting said metal sheets, said structural elements defining abrasion resistant outer surface portions thereof exposed for abrasion and crush force resisting contact with well components during movement of said protective jacket assembly within the well.

56. An uninterrupted, liquid and gas impervious crush and abrasion resistant sealed protective jacket assembly having sufficient tensile strength to support the weight of long lengths thereof, said protective jacket assembly comprising:
 (a) elongated, uninterrupted conductor means extending the length of said protective jacket assembly;
 (b) first and second elongated uninterrupted metal sheets defining grooves extending the length of said protective jacket assembly;
 (c) a pair of spaced welds securing said metal sheets in assembly along opposed sides thereof, said welds and said grooves cooperating to define sealed metal sheath means forming an elongated seal conductor passage extending the length of said protective jacket assembly, said conductor means being located within said elongated sealed conductor passage of said sealed metal sheath means;
 (d) a pair of interrupted longitudinal metal structural elements being positioned at opposed sides and externally of said metal sheath and being structurally interconnected with at least one of said metal sheets, said longitudinal structural elements having at least a part thereof exposed for guiding and protective contact with other structures as said protective jacket assembly is moved linearly relative to said other structures, said longitudinal structural elements each preventing crushing and abrading of said metal sheath means and said conductor means when in contact with said other structures, said longitudinal structural elements being of sufficient tensile strength to support the weight of said protective jacket assembly and included conductor means.

57. A sealed gas and liquid impervious, crush and abrasion resistant protective jacket assembly comprising:
 (a) a pair of elongated uninterrupted metal sheets of sufficient length to extend from a well head apparatus to a zone of interest within said well, said metal sheets being in welded assembly and defining a sealed protective metal sheath extending the length of said protective jacket assembly; and
 (b) a pair of uninterrupted longitudinal metal structural elements of substantially the same length as the length of said metal sheets, said structural elements and said metal sheets being structurally interconnected at inner portions of said structural elements at edge portions of said metal sheets, said structural elements providing structural protection for said metal sheath to prevent well components from forceably contacting said metal sheets, said structural elements defining abrasion resistant outer surface portions thereof exposed for abrasion and crust resisting contact with well components during movement of said protective jacket assembly within the well, and
 (c) said sealed protective metal sheath being adapted to carry a plurality of conductor means.

58. An uninterrupted, liquid and gas impervious, crushed and abrasive resistant seal protective jacket assembly having sufficient tensile strength to support the weight of long lengths thereof, said protective jacket assembly comprising
 (a) elongated, uninterrupted conductor means extending the length of said protective jacket assembly;
 (b) first and second elongated, uninterrupted metal sheets defining a groove extending the length of said protective jacket assembly;
 (c) a pair of spaced welds securing said metal sheets in assembly along opposed sides thereof, said welds and said groove cooperating to define sealed metal sheath means forming an elongated sealed conductor passage extending the length of said protective jacket assembly, said conductor means being located within said elongated sealed conductor passage of said sealed metal sheath means;

(d) a pair of uninterrupted longitudinal metal structural elements being positioned at opposed sides and externally of said metal sheath and being structurally interconnected with at least one of said metal sheets, said longitudinal structural elements having at least a part thereof exposed for guiding and for protective contact with other structures as said protective jacket assembly is moved linearly relative to said other structures, said longitudinal structural elements preventing crushing and abrading of said metal sheath means and said conductor means when in contact with said other structures, said longitudinal structural elements being of sufficient tensile strength to support the weight of said protective jacket assembly and included conductor means.

59. The sealed protective jacket assembly as recited in claim 58 wherein said elongated, uninterrupted conductor means extending the length of said protective jacket assembly comprise a plurality of conductors disposed contiguously together within said sealed metal sheath means and substantially linearly between said longitudinal metal structural elements.

60. The sealed protective jacket assembly as recited in claim 59 wherein the space between said conductors and said sheath is filled with a dielectric medium.

61. The sealed protective jacket assembly as recited in claim 58 wherein said elongated, uninterrupted conductor means extending the length of said protective jacket assembly comprises a plurality of conductors extending in twisted configuration within the length of said sealed conductor passage and in contiguous relationship within said walls of said sealed metal sheath means.

62. The sealed protective jacket assembly as recited in claim 61 wherein the space between said conductors and said sheath is filled with a dielectric medium.

* * * * *